TUNABLE VELOCITY MODULATED ELECTRON DISCHARGE DEVICE

Filed Jan. 4, 1947

Inventor:
James M. Lafferty,
by Harry E. Dunham
His Attorney.

Patented Jan. 8, 1952 2,582,045

UNITED STATES PATENT OFFICE 2,582,045

TUNABLE VELOCITY MODULATED ELECTRON DISCHARGE DEVICE

James M. Lafferty, Schenectady, N. Y., assignor to General Electric Company, a corporation of New York Application January 4, 1947, Serial No. 720,250

12 Claims. (Cl. 315—5)

Figure 1:
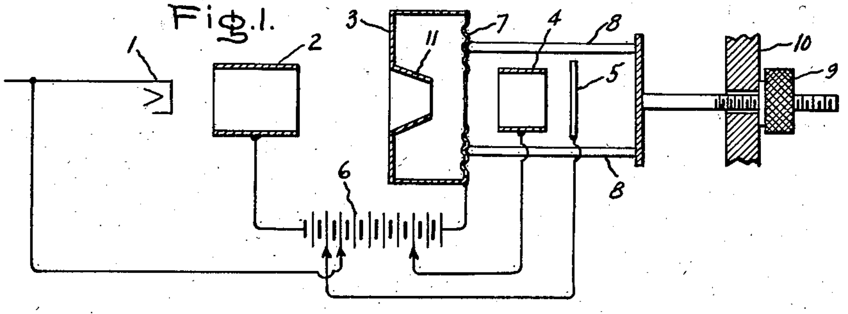

This invention pertains to electron discharge devices such as oscillators, amplifiers or the like, employing a velocity modulated beam of electrical particles and has for its object the provision of an improved construction capable of being tuned over a wide range of frequencies without substantial change in the efficiency of operation throughout the range and in which the relation between frequency change and motion of the tuning element may be readily prearranged to provide any desired frequency change characteristic.

For various usages in the high frequency electromagnetic wave arts, such as for the purpose of generating or amplifying high frequency oscillations, there have been developed, in recent years, numerous electron tube constructions employing the principle of velocity modulation of an electron beam i. e. constructions in which a moving electron beam having induced periodic density variations along its length is caused to pass in the vicinity of a resonant circuit element, such as a cavity resonator, in such manner that the density variations will induce and sustain oscillations in the resonant element. Such constructions have not been as satisfactory as could be desired for the aforesaid purposes principally because they exhibit inherent limitations as regards the extent of the frequency range throughout which they may be tuned and as regards the characteristics of the relation between frequency change and the motion of the tuning element. For example, in many constructions it has been found that while they may be tunable throughout a reasonably wide range of frequencies, nevertheless the efficiency and power output possibilities of the device are found to be impaired at the extreme ends of the range. Moreover, it has been found that the relationship between the frequency change and the motion of the tuner is not always linear or such that fine adjustments may be made. The desiderata of the art, for the devices of this nature, are, of course, a device which may be tuned throughout a maximum possible range of frequencies without substantial decrease in the efficiency or the power output of the device and which at the same time permits fine adjustments of frequency with a preferably linear relation between the frequency change and the motion of the tuning element which effects that change.

As is well known, tuning of a cavity resonator is normally accomplished by changing its inductive and capacitative properties either by the insertion within the cavity of a movable plunger which changes the inductance and capacitance in accordance with its motion or by use of flexible resonator walls which when flexed produce corresponding changes in the inductive and capacitative properties. Prior art tuning constructions of the plunger type have not permitted a satisfactorily wide range of tuning frequencies primarily because geometrical limitations have prohibited the introduction of a tuning plunger of satisfactorily large inductive or capacitative properties. Prior art tuning constructions of the flexible wall type have not been entirely satisfactory primarily because movement of the flexible wall member effects certain hereinafter described changes which impair the efficiency of operation at the extreme ends of the tuning range of which the device is capable. Accordingly, it is the general object of this invention to provide a construction which is measurably improved in both of these respects.

Generally speaking, the invention obviates the aforementioned shortcomings to a considerable degree and thereby attains the object of the invention by providing a construction in which the resonant cavity is laminated in form providing interstices between the laminations into which a plurality of plungers may be inserted thereby providing a measurably greater inductive and capacitative change as the tuning element comprising the plungers is moved in and out of the cavity. At the same time because this construction eliminates the disadvantageous characteristics of the flexible type wall tuning arrangement, it obviates to a considerable degree the efficiency impairing characteristics of the flexible wall type of tuning.

Figure 2:
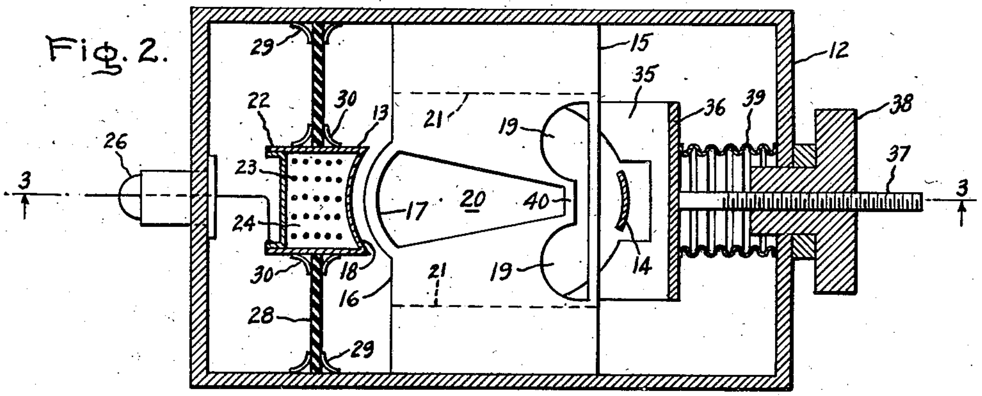
Figures 3, 4:
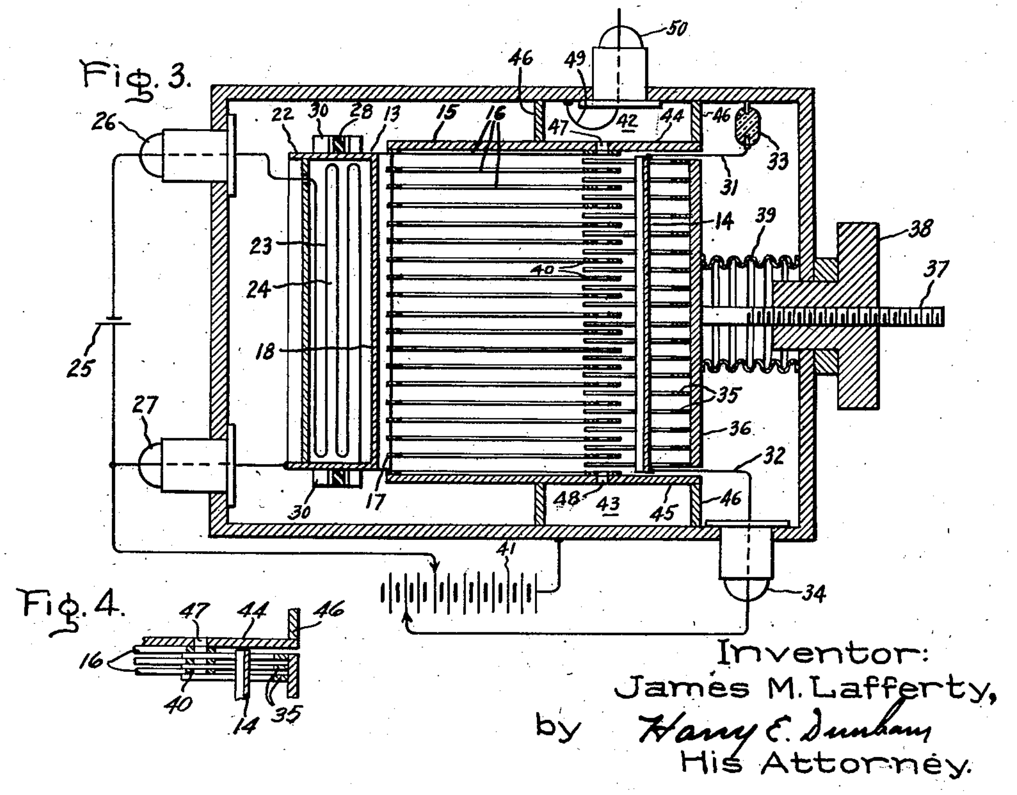

The features of the invention desired to be protected are set forth in the appended claims. The invention itself together with its further objects and advantages may best be understood by reference to the following specification when taken in connection with the accompanying drawing in which Fig. 1 represents schematically a prior art construction having one of the mentioned limitations; Fig. 2 represents an electric discharge device embodying the principles of the present invention; Fig. 3 represents in cross section a view of the device taken along the lines 3—3 of Fig. 2, and Fig. 4 is a fragmentary cross section view representing another embodiment of the invention.

In Fig. 1 there is shown for the purposes of illustration, a velocity modulated electron discharge device of the reflex type which may include within an evacuated envelope (not shown), a cathode 1, a cylindrical focusing electrode 2, a toroidal cavity resonator 3 having a central aperture therethrough, a second cylindrical focusing electrode 4, and a reflecting electrode 5. As is well understood in the art, a narrow electron beam may be caused to pass from the cathode 1 through the electrode 2, the cavity resonator 3 and the second focusing electrode 4 whereupon it is reflected by the electrode 5 through the central aperture in the resonator 3 to excite resonant oscillations therein. It will be understood, of course, that periodic density variations lengthwise of the beam will be induced in the beam after its first passage through the cavity 3 and that such density variations will sustain oscillations within the cavity 3 during the return of the beam to the cavity on its reversed motion. To effect such behavior appropriate electrostatic potentials may be applied to the various electrodes by any suitable means such as the battery 6 which, by means of a connection indicated, imposes, with respect to the cathode, a high positive potential on the resonator 3, a negative potential on the focusing electrode 2, a negative or slightly positive potential on the focusing electrode 4 and finally a negative potential on the reflecting electrode 5.

Tuning of the device indicated in Fig. 1 is normally accomplished by use of a flexible wall 7 forming one end of the cavity resonator, the flexible wall being movable in and out under the pressure of a suitable member such as rods 8 and adjustable by means of the thumb screw 9 engaging the fixed wall 10 which is preferably fixed with respect to the resonator 3 itself. When tuning over a large range is attempted by means of the apparatus indicated in Fig. 1 one is confronted with a rather serious limitation. As the gap between the flexible wall 7 and the cone shaped portion 11 of the opposite wall is increased by any great amount in order to decrease the wave length of oscillations, the gap co-efficient is greatly reduced. In general for the greatest efficiency of operation of the device it is desirable to keep this gap co-efficient as large as possible and in no case should it fall below about 0.65 if satisfactory efficient operation is to be obtained. The gap co-efficient may be defined as follows:

$$M=\frac{\sin\frac{A}{2}}{\frac{A}{2}}$$

where A is the transit angle across the gap expressed in radians. A is given by the expression:

$$A=3179\frac{D}{L}\frac{1}{V_0}$$

where D is the length of the gap, L is the wave length of the oscillator expressed in the same units and $V_0$ is the beam potential in volts. It will be seen from these equations that if D is increased to decrease the wave length of the cavity, A will increase very rapidly because the change in both the factors D and L tend to increase A.

In other prior art methods heretofor mentioned, suitable plungers either of metallic or non-conducting materials are inserted into the resonator 3 a variable distance by any suitable means such as means similar to the thumb screw mechanism of Fig. 1. However, the prior art arrangements of this type generally involve only a small plunger inserted through an appropriate aperture in the wall of the resonator. Because of the limited amount of inductive or capacitative change effected by such members and because the geometrical configuration of the resonator 3 does not permit of the introduction of plungers of large size, the resultant tuning effect obtainable has been considerably limited. Thereby the tuning range of the device is correspondingly limited.

Although it will be understood that the principles of the invention are applicable to all types of velocity modulation discharge devices regardless of the geometrical configuration of the cavity and the electrodes, there is shown in Figs. 2 and 3 as one illustration of the inventive principles, an electron discharge device of the velocity modulation type employing reflex principles and the principles of an electrode configuration having symmetry about a flat plane such as that described and broadly claimed in my co-pending application Serial No. 710,336, filed November 16, 1946, now Patent No. 2,489,298, issued November 29, 1949, and assigned to the same assignee as the present invention. The device shown may comprise generally a preferably metallic hermetically sealed envelope 12 formed in a parallelepiped or other geometrical shape having considerable extension in one plane such as the plane of Fig. 3. Within the envelope 12 there is provided a cathode 13, a reflecting electrode 14 and an accelerator anode structure 15 comprising the laminated anode elements 16 each provided with an arcuate extension 17 all of which together form a focusing grid juxtaposed to the corresponding arcuate surface 18 of the cathode. A cavity resonator structure is formed within the accelerator anode structure by means of the aligned openings 19 formed by stamping out portions of each of the anode elements 16. In order that an electron beam emanating from the cathode 13 may be focused into a generally planar configuration through the accelerator anode structure 15, a wedge shaped open chamber of generally frustoconical cross section is formed in the accelerator anode structure by the aligned openings 20 formed by stamping out portions of each of the anode elements 16. As indicated more clearly in Fig. 3, the cathode 13, the anode structure 15 and the electrode 14 may have considerable extension in the direction perpendicular to the plane of Fig. 2, i. e. they will be elongated to extend completely across the width of the envelope in a manner indicated more clearly in my aforementioned application.

More specifically as regards the accelerator anode structure 15, it may be formed by stacking a plurality of the anode elements 16 together with appropriate spacers 21 in order that a series of planar interstices may be formed between the laminations. This composite structure may be made rigid by brazing or otherwise securing all of the anode elements 16 to the spacers 21 and thereafter brazing or otherwise securing the entire unit to the walls of the envelope 12. The cavity resonator structure formed by the aligned openings 19 of the accelerator anode elements may be given any suitable configuration which presents cavities of the desired configuration necessary to oscillate at the desired frequencies. For example, it is shown as being formed by stamped out openings 19 of semi-circular cross section, two in each of the anode elements, which when the elements are assembled form symmetrically positioned cavities extending laterally across the envelope and interrupted only by the interstices between the laminations. The thin bridge portions 40 of each of the anode elements 16 have the advantage that they help to maintain the gap co-efficient at a high value and keep the field within the cavities from fringing outward and thereby decreasing efficiency. The chamber formed by the frustoconical openings 20 may have a configuration suitable for creating an electrostatic field pattern of configuration adapted to focus the electron beam into the desired planar or wedge shape and may be constructed in a like manner. As is well understood in the art appropriate shaping of the surfaces of the frustoconical openings 20 as well as the concave surface of the cathode will result in desired shaping of the electron beam configuration. The arcuate extensions 17 forming the grid may be constructed in a like manner and in general will be shaped to conform to the corresponding cross section of the opposing cathode surface 18. They are preferably so constructed as to be juxtaposed in close proximity to that cathode surface in order that optimum focusing effect may be obtained. It will be understood that the thickness of the various elements 16 of the accelerator anode structure is preferably minimized in order to minimize any effect they may have in tending to collect electrons coming from the cathode and thereby detracting from the overall power output and efficiency of the device.

Since the major portion of the energy losses dissipated as heat by the device is dissipated in the accelerator anode and the cavities integral therewith, the accelerator anode construction indicated is particularly advantageous in that heat may be directly conducted to the metallic envelope and thereby dissipated externally in order that the electrode structure may not operate at too high a temperature.

The cathode 13 may comprise any suitable structure which presents to the accelerator anode structure a concave cylindrical sector portion having the surface 18 capable of focusing electrons emanating from a suitable thermionically active coating on the surface 18 into the accelerator focusing chamber formed by the opposing surfaces of the frustoconical openings 20. For example, it may comprise a box like structure 22 having the concave cylindrical sector portion as an end wall facing the accelerator anode structure. The surface of the portion 18 may be coated with any of the suitable thermionically emissive substances known in the art. Any suitable means for raising that surface to an electronically emissive temperature may be provided such as the heater wires 23 embedded within a ceramic or other insulating material 24 within the interior of the box-like structure 22. Any suitable means for energizing said heater wires may be provided such as the battery 25 connected to the heater by the externally accessible leads shown extending through and insulated from the envelope by the hermetic sealing beads 26 and 27 of glass or like material. The cathode may be supported in insulating relationship to the envelope 12 by any suitable means such as the insulating wall 28 affixed to the envelope 12 by means of the metallic clamps 29 which may be spot-welded or otherwise affixed to the envelope. The cathode may be supported within suitable slots in the insulating wall 28 and rigidly affixed thereto by metallic clamps 30 spot-welded or otherwise affixed to structure 22.

In order to provide optimum electron beam focusing effects by the grid formed by the extensions 17 of the accelerator anode structure it is preferable that spacing in between the adjacent extensions i. e. the spacing between laminations of the section themselves be small in relation to the distance from the cathode to the opposing surface of the grid. For example, the distance between any two extensions 17 is preferably less than one half the distance from those sections to the cathode surface. While the grid is indicated as preferably being formed of parallel extensions in this manner in order that parallel interstitial spaces may be presented to the electron beam, it will be understood that this grid structure may also be formed of any other suitable means such as a mesh of mutually perpendicular wires in the manner of grid constructions known in the art or that indicated in my aforementioned application. The dimensions of the interstitial spaces of such wires should however be small by comparison with the distance from the grid to the cathode for optimum focusing effect.

The reflecting electrode 14 may comprise any suitable form which presents a generally concave surface adapted to reflect and focus the electron beam back into the vicinity of the cavities. For example, it is shown as comprising a bar extending laterally across the envelope and having a cylindrical concave surface formed in the side presented to the cavity resonators. The electrode 14 may be supported in insulating relationship to the envelope 12 by any suitable means such as the supporting members 31 and 32 one of which is rigidly secured to the envelope 12 by means of the bead 33 of vitreous or similar insulating material. The other supporting lead is connected to the bead 34 of vitreous or other insulating material which forms a hermetically sealed passageway for the lead to the exterior of the device in order that suitable potentials may be applied to the electrode 14 as hereinafter indicated.

Tuning of the device i. e. tuning of the cavities formed by openings 19 may be effected by inserting metallic or non-conducting members into their vicinity in order to change their inductive and capacitative properties. As shown in the drawing, the tuning means to accomplish this result in accordance with the present invention may comprise a series of parallel flat tuning members 35 adapted to be extended variable distances into the spaces formed by the interstices between the anode elements 16. If desired, the members 35 may be arranged so that their surfaces make sliding contact with the surfaces of elements 16, as is illustrated in Fig. 4 wherein like numerals are employed to identify elements mentioned hereinbefore. Moreover, they may be shaped as indicated to avoid contact with electrode 14 and may be supported by any suitable means. For example, they are shown as being welded to and supported from a metallic plate 36 rigidly affixed to a control rod 37 which may be moved backwards and forwards by means of the thumb screw 38 operating on the threaded portions of rod 37 and suitably affixed to the wall of the envelope in such manner as to permit rotation. In order to maintain the hermetic sealing of the envelope at this point any suitable means for sealing the joint may be provided such as the bellows 39 which is expansible and contractible and which is brazed or otherwise hermetically sealed to the plate 36 and the envelope wall. Bellows 39 may be formed as a compressed spring in order to cooperate with thumb screw 38 for adjustment of the plate 36 and its attached members 35. It will be observed that the members 35 may be inserted into and withdrawn from the cavity formed by openings 19 to any desirable distance in order to effect tuning. The inner ends of the members 35 may be shaped to provide any suitable tuning characteristics desired for example, it will be understood that they may be so shaped that the frequency of oscillation or the natural resonant frequency of the cavities will vary in linear relation to the extent to which the tuning members are inserted into the cavities.

It will be readily apparent to those skilled in the art that the foregoing construction obviates to a considerable degree the aforementioned shortcomings of the prior art type of tunable cavity resonators. Thus, it provides for coupling into the resonator a considerable amount of impedance in the form of a plunger comprising the various members 35, thereby giving a considerable resonant frequency range to the cavities. Furthermore, the fact that the variable gap characteristics of the Fig. 1 type of velocity modulation device has been eliminated will eliminate any adverse tuning effects which accompany variations in that gap.

It will also be apparent to those skilled in the art that when suitable potentials corresponding to those imposed on corresponding electrodes of velocity modulation devices heretofore known are applied to the various electrodes described above, a thin, substantially wedge shaped electron beam having substantial extended area in a direction transverse to the direction of motion of the electron beam will be formed along a path extending from the cathode 13 through the opening in the anode structure 15 and past the cavity resonator structure toward the reflecting electrode 14. Thereupon it will be reflected into the vicinity of the cavities formed by openings 19 along its entire width. By means of reflex velocity modulation principles, oscillations will thereby be induced in the cavities. For the purpose of applying these potentials any suitable means may be employed such as the battery 41 which imposes with respect to the cathode a relatively high positive voltage upon the accelerating anode structure and a negative voltage on the reflecting anode.

For the purpose of extracting useful energy from the cavity resonator structure or for the purpose of introducing energy for amplification or like purposes any suitable means may be provided. For example, suitable coupling loops may be inserted within the chambers 42 and 43 formed between the accelerating anode outer walls 44 and 45 and the wall of the envelope by the wall portions 46 coextensive with the walls 44 and 45. Openings 47 and 48 in walls 44 and 45 may be provided to permit energy to flow from the cavities into chambers 42 and 43. To that end openings 47 and 48 are preferably coextensive with openings 19 at least in the vertical direction. One such coupling loop 49 is shown in chamber 42 and may be conductively connected to the enevelope wall as indicated while the other end extends to the exterior of the device through a suitable hermetic seal such as the glass bead 50. Inasmuch as the device illustrated is indicated as an oscillator the coupling loop is shown as being provided on only one side of the accelerator anode structure, that is, in the chamber 42. It will be understood that if the device is to be employed as an amplifier similar input or output coupling means may be provided in the chamber 43 on the opposite side or such additional coupling means may also be provided as a further output coupling if the device is employed as an oscillator.

In order that the device may operate at optimum efficiency it is also preferable that the wave guide like structure formed by the cavity formed by openings 19 operate near its cutoff wave length so that the phase wave length along the transverse direction of the structure is long. As a result the high frequency electrical field is maintained at a high percentage of its maximum value at the center along the entire length of the cavity.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A tunable cavity resonator structure comprising a plurality of spaced metallic members having aligned openings defining a reentrant cavity resonator and aligned openings defining a chamber having walls adapted to focus an electrical particle beam into the vicinity of said resonator, said members also having portions extending across said second mentioned openings constituting a grid structure for further focusing said beam, and means for controlling the resonant frequency of said resonator comprising a plurality of members adjustably positioned in the interstices between said first mentioned members.

2. A tunable cavity resonator structure comprising a plurality of parallel spaced metallic members having aligned openings defining a reentrant cavity resonator and aligned openings defining a chamber having walls adapted to focus an electrical particle beam into the vicinity of said resonator, said members also having portions extending across said second mentioned openings constituting a grid structure for further focusing said beam, and means for controlling the resonant frequency of said resonator comprising a plurality of parallel members adjustably positioned in the interstices between said first mentioned members.

3. An electrical discharge device of the velocity modulation type comprising a plurality of electrodes for establishing a velocity modulated electrical particle beam including a cathode and a tunable resonant electrode structure comprising a plurality of spaced metallic members having aligned openings defining a cavity resonator and aligned openings opposed to said cathode defining a chamber having walls adapted to focus an electrical particle beam emanating from said cathode into the vicinity of said resonator, said members also having portions extending across said second mentioned openings constituting a grid structure for further focusing said beam, and means for controlling the resonant frequency of said resonator comprising a plurality of members adjustably positioned in the interstices between said first mentioned members.

4. An electrical discharge device of the velocity modulation type comprising a plurality of electrodes for establishing a velocity modulated electrical particle beam including a cathode and a tunable resonant electrode structure comprising a plurality of parallel spaced metallic members having aligned openings defining a cavity resonator and aligned openings opposed to said cathode defining a chamber having walls adapted to focus an electrical particle beam emanating from said cathode into the vicinity of said resonator, said members also having portions extending across said second mentioned openings constituting a grid structure for further focusing said beam, and means for controlling the resonant frequency of said resonator comprising a plurality of parallel members adjustably positioned in the interstices between said first mentioned members.

5. An electrical discharge device of the velocity modulation type comprising a plurality of electrodes for establishing a planar electrical particle beam including a cathode having an elongated active surface constituting a source of said beam and a tunable resonant electrode structure comprising a plurality of spaced substantially parallel metallic members having aligned openings defining an elongated cavity resonator and aligned openings defining an elongated chamber having walls adapted to focus said beam into the vicinity of said resonator, said members also having portions extending across said second mentioned openings constituting a grid structure for further focusing said beam, and means for controlling the resonant frequency of said resonator comprising a plurality of parallel members adjustably positioned in the interstices between said first mentioned members.

6. An electrical discharge device of the velocity modulation type comprising a plurality of electrodes for establishing a planar electrical particle beam including a cathode having an elongated active surface constituting a source of said beam and a tunable resonant electrode structure comprising a plurality of spaced substantially parallel metallic members each having aligned openings symmetrically positioned with respect to said beam defining elongated cavity resonators on opposite sides thereof and aligned openings defining an elongated chamber having walls symmetrically positioned with respect to said beam on opposite sides thereof and adapted to focus said beam between said resonators, said members also having portions extending across said second mentioned openings constituting a grid structure for further focusing said beam, and means for controlling the resonant frequency of said resonator comprising a plurality of parallel members adjustably positioned in the interstices between said first mentioned members.

7. An electrical discharge device of the velocity modulation type comprising a plurality of electrodes for establishing a planar electrical particle beam including a cathode having an elongated active surface constituting a source of said beam and a tunable resonant electrode structure comprising a plurality of spaced substantially parallel metallic members having aligned openings defining an elongated cavity resonator and aligned openings defining an elongated chamber having walls adapted to focus said beam into the vicinity of said resonator, said members also having arcuate portions extending toward said cathode and across said second mentioned openings constituting a grid structure cooperating with said cathode for further focusing said beam, and means for controlling the resonant frequency of said resonator comprising a plurality of parallel members adjustably positioned in the interstices between said first mentioned members.

8. An electrical discharge device of the velocity modulation type comprising a plurality of electrodes for establishing a planar electrical particle beam including a cathode having an elongated active surface constituting a source of said beam and a tunable resonant electrode structure comprising a plurality of spaced substantially parallel metallic members each having aligned openings symmetrically positioned with respect to said beam defining elongated cavity resonators on opposite sides thereof and aligned openings defining an elongated chamber having walls symmetrically positioned with respect to said beam on opposite sides thereof and adapted to focus said beam between said resonators, said members also having arcuate portions extending toward said cathode and across said second mentioned openings constituting a grid structure cooperating with said cathode for further focusing said beam, and means for controlling the resonant frequency of said resonator comprising a plurality of parallel members adjustably positioned in the interstices between said first mentioned members.

9. A tunable cavity resonator structure comprising a plurality of parallel spaced metallic members having aligned openings defining a reentrant cavity resonator and means for controlling the resonant frequency of said resonator comprising a plurality of parallel members of non-conductive material adjustably positioned in the interstices between said first mentioned members.

10. A tunable cavity resonator structure comprising a plurality of spaced metallic members having aligned openings defining a cavity resonator and means for controlling the resonant frequency of said resonator comprising a plurality of parallel members adjustably positioned in the interstices between said first mentioned members and making sliding contact therewith.

11. An electrical discharge device of the velocity modulation type comprising a plurality of electrodes for establishing a velocity modulated electric particle beam including a cathode and a tunable resonant electrode structure comprising a plurality of spaced metallic members having aligned openings defining a cavity resonator and aligned openings defining a cavity having walls adapted to focus an electrical particle beam emanating from said cathode into the vicinity of said resonator, and means for controlling the resonant frequency of said resonator comprising a plurality of members of non-conductive material adjustably positioned in the interstices between said first mentioned members.

12. An electrical discharge device of the velocity modulation type comprising a plurality of electrodes for establishing a velocity modulated electric particle beam including a cathode and a tunable resonant electrode structure comprising a plurality of spaced metallic members having aligned openings defining a cavity resonator and aligned openings defining a cavity having walls adapted to focus an electrical particle beam emanating from said cathode into the vicinity of said resonator, and means for controlling the resonant frequency of said resonator comprising a plurality of members adjustably positioned in the interstices between said first mentioned members and making sliding contact therewith.

JAMES M. LAFFERTY.

REFERENCES CITED

The following references are of record in the file of this patent:

UNITED STATES PATENTS

| Number | Name | Date |
|---|---|---|
| 2,242,275 | Varian | May 20, 1941 |
| 2,272,211 | Kohler | Feb. 10, 1942 |
| 2,320,860 | Fremlin | June 1, 1943 |
| 2,399,223 | Haeff | Apr. 30, 1946 |
| 2,444,080 | Williams | June 29, 1948 |
| 2,457,495 | Rochester | Dec. 28, 1948 |
| 2,476,971 | Fremlin | July 26, 1949 |
| 2,477,122 | Garner | July 26, 1949 |